US007584913B1

(12) United States Patent
Lo

(10) Patent No.: US 7,584,913 B1
(45) Date of Patent: Sep. 8, 2009

(54) SAFETY SWITCH OF A PAPER SHREDDER

(76) Inventor: Emily Lo, No. 18, 20 Lane, Hsin Feng Street, Hsin Chuang City, Taipei Shien (TW)

( * ) Notice: Subject to any disclaimer, the term of this patent is extended or adjusted under 35 U.S.C. 154(b) by 59 days.

(21) Appl. No.: 11/895,785

(22) Filed: Aug. 27, 2007

(51) Int. Cl.
*A47J 43/046* (2006.01)

(52) U.S. Cl. ..................................... 241/37.5; 241/100

(58) Field of Classification Search ................. 241/100, 241/236, 37.5, 101.2
See application file for complete search history.

(56) References Cited

U.S. PATENT DOCUMENTS 3,233,061 A * 2/1966 Jones, Jr. .................... 335/205
4,319,146 A * 3/1982 Wires, Sr. ................... 307/328
2004/0129810 A1* 7/2004 Kasprowicz et al. ..... 241/101.2
2008/0136197 A1* 6/2008 Lin ......................... 292/251.5

* cited by examiner

*Primary Examiner*—Faye Francis
(74) *Attorney, Agent, or Firm*—Pro-Techtor Int'l Services; Ralph Willgohs

(57) ABSTRACT

A safety switch of a paper shredder is a safety switch that is installed on an ordinary paper shredder. Another magnet is installed on a scrap paper bin or a door panel, and by using a magnet to repulse or attract a magnetic block inside the safety switch, power is shut off at a same time when the scrap paper bin is pulled out or the door panel is opened for taking out the scrap paper bin.

2 Claims, 3 Drawing Sheets

SAFETY SWITCH OF A PAPER SHREDDER

BACKGROUND OF THE INVENTION

1. Field of the Invention

The present invention relates to a safety switch of a paper shredder, and more particularly to a safety switch installed on a paper shredder, wherein the switch is used to cut off a power switch momentarily at a same time when a scrap paper bin is opened, by using a principle of magnetic repulsion and attraction.

2. Description of the Prior Art

All paper shredders are installed with power switches. As a user often forgets to turn off the power switch after shredding papers, it is possible that fingers can be cut when the user pulls out a scrap paper bin to clear paper chips, due to that the power switch has not been turned off.

SUMMARY OF THE INVENTION

Accordingly, the primary object of the present invention is to provide a safety switch of a paper shredder, wherein a safety switch is located at a proper position on the paper shredder, and another magnet is installed on a scrap paper bin or a door panel, such that when the scrap paper bin is positioned, power will be turned on due to that a magnetic block of the safety switch is repulsed or attracted by the magnet; and when the scrap paper bin is pulled out to release the magnet from the magnetic block, the power is cut off momentarily by the safety switch.

To enable a further understanding of the said objectives and the technological methods of the invention herein, the brief description of the drawings below is followed by the detailed description of the preferred embodiments.

DETAILED DESCRIPTION OF THE PREFERRED EMBODIMENTS

Figure 1:
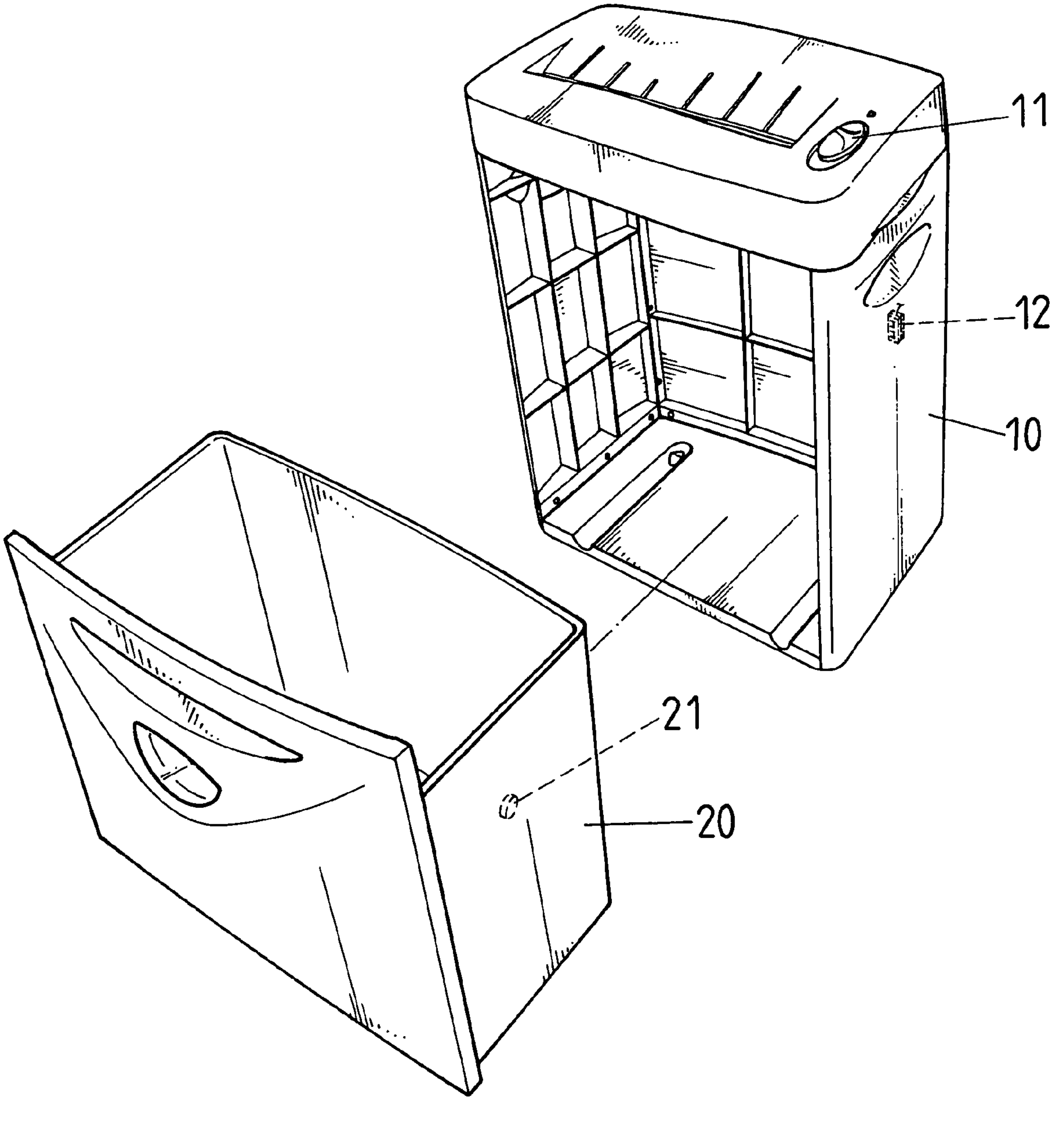
FIG. 1 shows a schematic view of a usage state of the present invention.

Referring to FIGS. 1, in addition to that a paper shredder 10 of the present invention is provided with a power switch 11, the paper shredder 10 is also installed with another safety switch 12, and an end of a scrap paper bin 20 is installed with a magnet 21.

Figure 2:
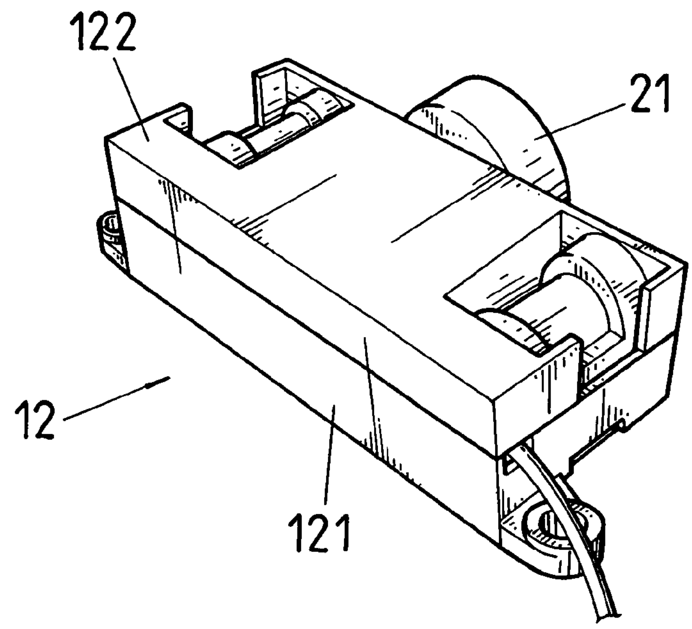
FIG. 2 shows a perspective view of a safety switch of the present invention.
Figure 3:
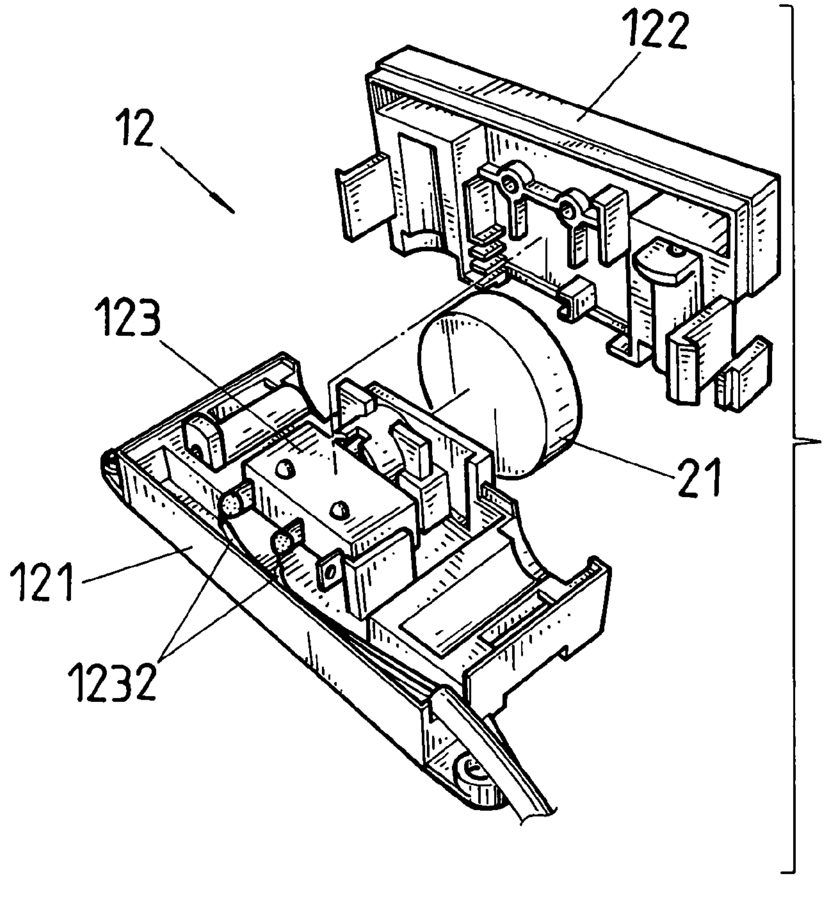
FIG. 3 shows a local exploded view of a safety switch of the present invention.
Figure 4:
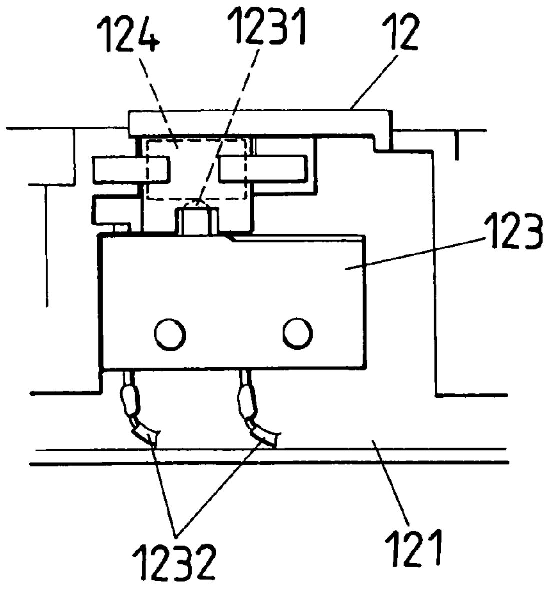
FIG. 4 shows a cutaway view of a safety switch of the present invention (power is cut off).

Referring to FIGS. 2 to 4, the safety switch 12 includes two housings 121, 122; a switch 123, which is installed in the two housings 121, 122, an end of which is provided with a push button 1231, and the other end of which is connected with two power cords 1231 for switching on; and a magnetic block 124, which is located at a front end of the push button 1231 of the switch 123.

Figure 5:
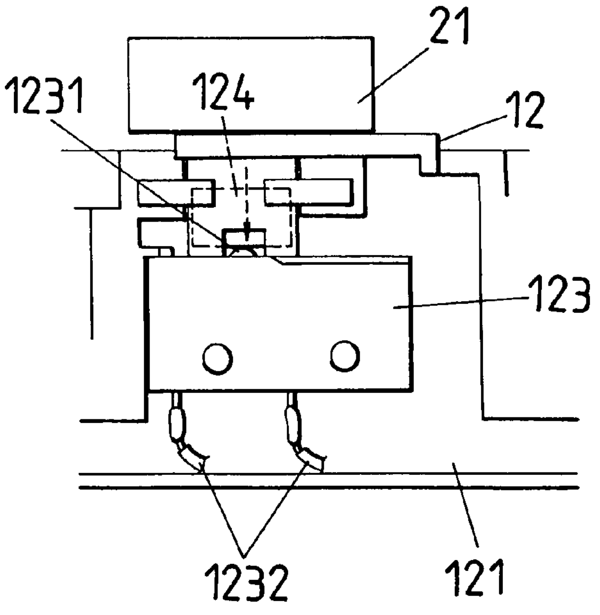
FIG. 5 shows another cutaway view of a safety switch of the present invention (power is turned on).

Referring to FIG. 5, when the scrap paper bin 20 is installed in an interior of the paper shredder 10, the magnet 21 is close to the safety switch 12, and repulses or attracts the magnetic block 124 to touch the push button 1231, so as to form an energized state.

Referring to FIG. 4, when the scrap paper bin 20 is pulled out to release the magnet 21 from the magnetic block 124, the magnetic block 124 will be separated from the push button 1231, due to that it is not repulsed or attracted by the magnet 21, thereby forming a non-energized state. Therefore, even when the power switch 11 of the paper shredder 10 is turned on, the paper shredder 10 will not operate.

Figure 6:
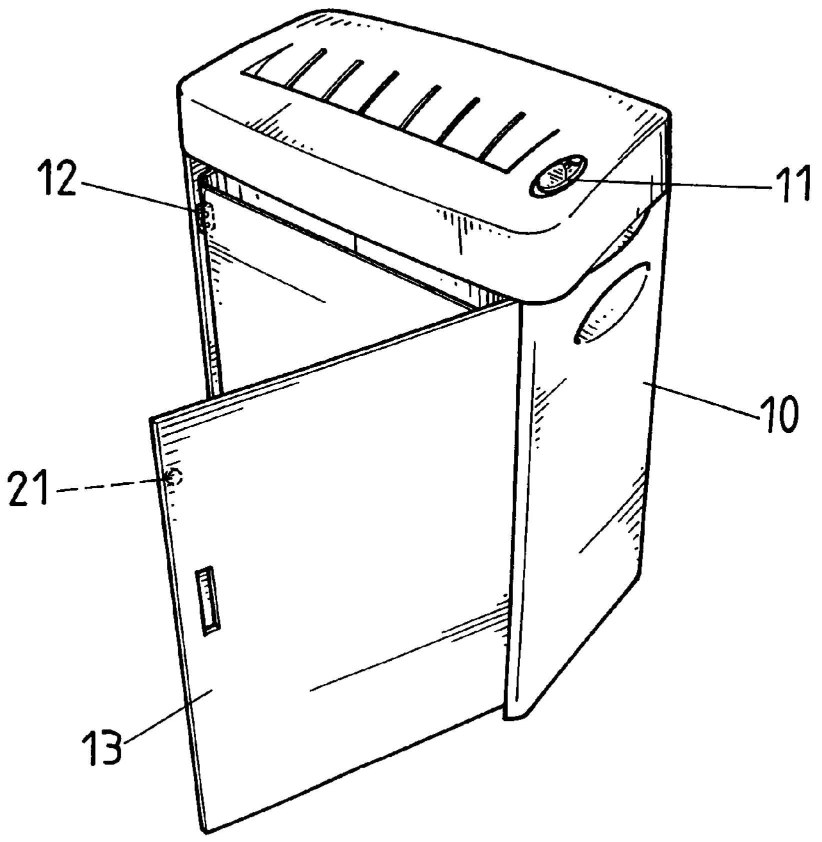
FIG. 6 shows a schematic view of an embodiment of the present invention.

Referring to FIG. 6, a scrap paper bin is emplaced inside a door panel 13 of the paper shredder 10, the door panel 13 is installed with the magnet 21, and the safety switch 12 is installed at a position close to an edge of the door panel 13. When the door panel 13 is opened, as the magnetic block of the safety switch 12 is not repulsed or attracted by the magnet 21, it is separated with the push button to form the non-energized state.

Accordingly, the present invention includes a safety switch 12 which is installed on an ordinary paper shredder 10, such that when a user pulls out a scrap paper bin 20 without turning off a power switch 11 carelessly, the safety switch 12 will immediately cut off the power switch 11.

It is of course to be understood that the embodiments described herein is merely illustrative of the principles of the invention and that a wide variety of modifications thereto may be effected by persons skilled in the art without departing from the spirit and scope of the invention as set forth in the following claims.

What is claimed is:

1. A paper shredder with a safety switch comprising a paper shredder;

a removable scrap paper bin having a closed bottom, an open top, and at least one side wall installed with a magnet;

a safety switch assembly installed on a sidewall of the paper shredder in close proximity to the magnet, the switch assembly including two-part housing with a pushbutton electrical switch and a magnetic block installed in an interior cavity thereof, the push button being oriented toward the paper bin and the electrical switch being connected to two power cords, with the magnetic block installed between the push button of the electrical switch and the magnet;

wherein when the scrap paper bin is installed in an interior of the paper shredder, the magnet causes the magnetic block to energize the push button; on the other hand, when the scrap paper bin is pulled out of the paper shredder, the magnet releases from the magnetic block, allowing the pushbutton switch to de-energize the paper shredder into a power-off state.

2. The paper shredder according to claim 1, wherein the paper shredder is installed with a door panel accessing the removable paper bin, on which, in the alternative, the magnet is mounted with the safety switch installed on the paper shredder at a position in close proximity to the magnet when the door is closed;

wherein when the door panel is opened, the magnet being separated from the magnetic block, causes the pushbutton switch to cut off a power source to the paper shredder.

* * * * *